(12) United States Patent
Kim (10) Patent No.: US 10,833,373 B2
(45) Date of Patent: Nov. 10, 2020

(54) BATTERY MODULE

(71) Applicant: SAMSUNG SDI CO., LTD., Yongin-si, Gyeonggi-do (KR)

(72) Inventor: Hyunkook Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 606 days.

(21) Appl. No.: 15/465,803

(22) Filed: Mar. 22, 2017

(65) Prior Publication Data

US 2017/0279160 A1 Sep. 28, 2017

(30) Foreign Application Priority Data

Mar. 23, 2016 (KR) .................. 10-2016-0034360

(51) Int. Cl.
*H01M 10/42* (2006.01)
*H01M 2/12* (2006.01)
*H01M 2/20* (2006.01)

(52) U.S. Cl.
CPC ....... *H01M 10/425* (2013.01); *H01M 2/1264* (2013.01); *H01M 2/202* (2013.01); *H01M 2010/4271* (2013.01); *H01M 2200/00* (2013.01)

(58) Field of Classification Search
CPC ....... H01M 10/425; H01M 2010/4271; H01M 2200/00; H01M 2/1264; H01M 2/202
See application file for complete search history.

(56) References Cited

U.S. PATENT DOCUMENTS

| 8,889,278 | B2 | 11/2014 | Lee et al. | |
|---|---|---|---|---|
| 2007/0126394 | A1* | 6/2007 | Kim | H01M 2/204 320/107 |
| 2010/0021802 | A1* | 1/2010 | Yang | H01M 2/0212 429/91 |
| 2013/0052513 | A1* | 2/2013 | Ogasawara | H01M 2/202 429/158 |
| 2013/0302651 | A1* | 11/2013 | Kim | H05K 1/148 429/7 |

FOREIGN PATENT DOCUMENTS

| KR | 10-1028936 | 4/2011 |
|---|---|---|
| KR | 10-2013-0061840 | 6/2013 |
| KR | 10-2014-0134837 | 11/2014 |

* cited by examiner

*Primary Examiner* — Robert S Jones, Jr.
*Assistant Examiner* — Rachel L Zhang
(74) *Attorney, Agent, or Firm* — Lee IP Law, P.C.

(57) ABSTRACT

A battery module includes a plurality of battery cells arranged in one direction, each of the battery cells including electrode portions, a connection tab connecting adjacent battery cells of the plurality of battery cells, and a protection circuit module having one side end portion connected to the connection tab. The connection tab includes a body portion that contacts the electrode portions of the adjacent battery cells and an extension portion extending from the body portion, the extension portion being connected to the protection circuit module. The extension portion includes at least one curved region.

15 Claims, 5 Drawing Sheets

BATTERY MODULE

CROSS-REFERENCE TO RELATED APPLICATION

Korean Patent Application No. 10-2016-0034360, filed on Mar. 23, 2016, in the Korean Intellectual Property Office, and entitled: "Battery module," is incorporated by reference herein in its entirety.

BACKGROUND

1. Field

Embodiments relate to a battery module, and more particularly, to a battery module for preventing a protection circuit module, such as a battery management system (BMS), from being fractured or damaged when a battery cell swells up.

2. Description of the Related Art

Generally, a device, such as a laptop or an electric car, uses a battery module in which a plurality of battery cells are connected to each other in parallel and/or in series. The plurality of battery cells are connected to each other by a connection tab (or a bus bar), wherein the connection tab is connected to a battery management system (BMS) and the BMS manages a battery assembly.

SUMMARY

Embodiments are directed to a battery module including a plurality of battery cells arranged in one direction, each of the battery cells including electrode portions, a connection tab connecting adjacent battery cells of the plurality of battery cells, and a protection circuit module having one side end portion connected to the connection tab. The connection tab includes a body portion that contacts the electrode portions of the adjacent battery cells and an extension portion extending from the body portion the extension portion being connected to the protection circuit module. The extension portion includes at least one curved region.

The one side end portion of the protection circuit module may be connected to a top surface of the connection tab.

The curved region may be provided on a same plane as a non-curved region of the extension portion, and may have a same thickness as the non-curved region.

A length of the extension portion may be greater than a distance between the body portion and the protection circuit module.

A thickness of the extension portion may be less than or equal to a thickness of the body portion.

The extension portion may be formed of a same material as the body portion.

At least one through hole may be located at an end portion of the extension portion. A coupling hole may be located in the protection circuit module to correspond to the through hole. The through hole and the coupling hole may be located on a same line in a vertical direction and may be coupled to each other by a coupling member.

The protection circuit module may include a first protection circuit module and a second protection circuit module, which respectively extend along opposite upper sides of the plurality of battery cells along a direction in which the plurality of battery cells are arranged. The first and second protection circuit modules may be spaced apart from each other on opposite sides with respect to vents of the plurality of battery cells and may be parallel to each other.

The first and second protection circuit modules may be connected to each other by at least one connecting unit.

The connecting unit may be formed of an elastic or flexible material.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
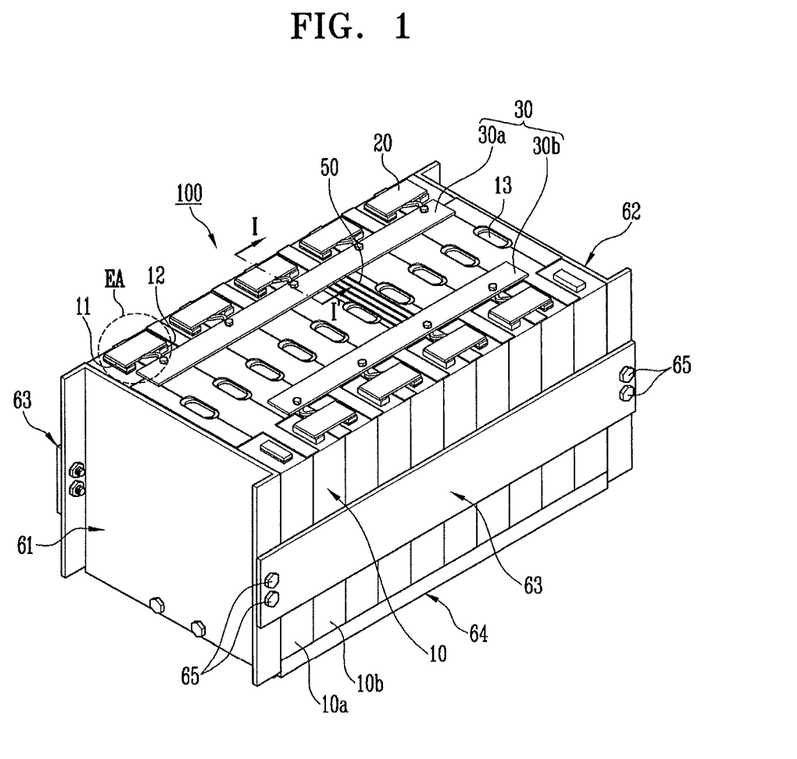
FIG. 1 illustrates a perspective view of a battery module according to an embodiment.
Figure 2:
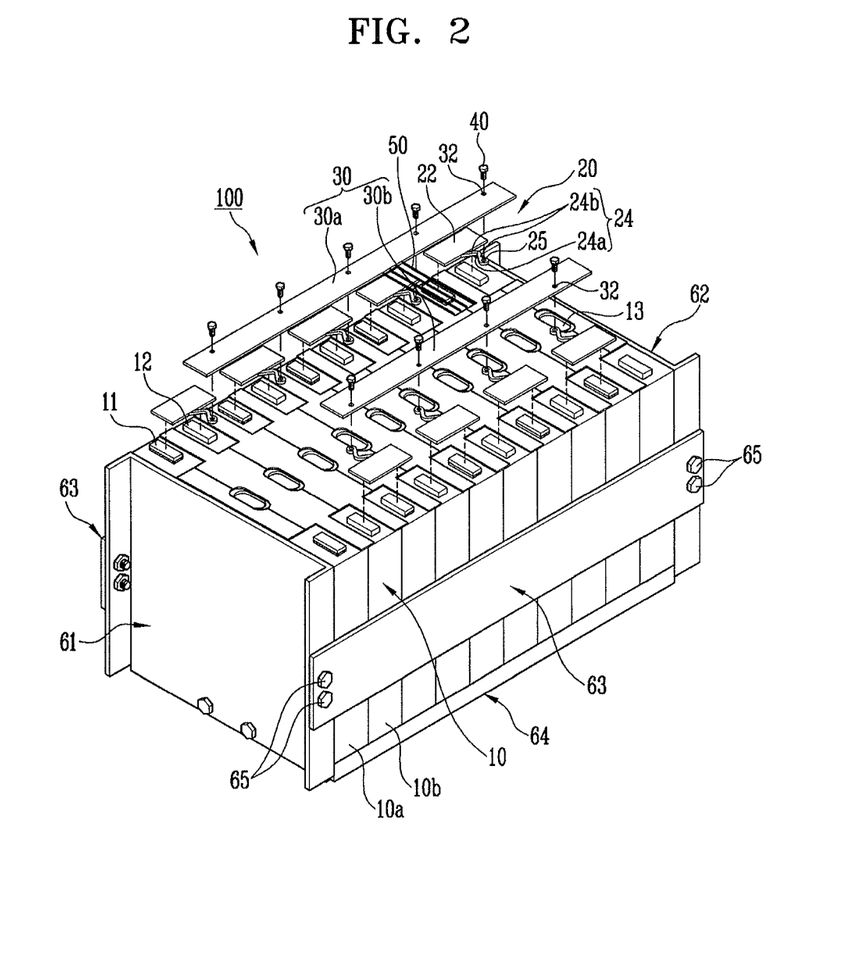
FIG. 2 illustrates an exploded perspective view of a battery module according to an embodiment.

FIG. 1 illustrates a perspective view of a battery module 100 according to an embodiment, and FIG. 2 illustrates an exploded perspective view of the battery module 100 according to an embodiment.

Referring to FIGS. 1 and 2, the battery module 100 according to an embodiment may include a plurality of battery cells 10 each including electrode portions 11 and 12 and arranged in one direction, a connection tab 20 connecting adjacent battery cells 10a and 10b of the plurality of battery cells 10, and a protection circuit module 30 having one side end portion connected to the connection tab 20. The protection circuit module 30 may constitute a battery management system (BMS). The connection tab 20 may include a body portion 22 contacting the electrode portions 11 and 12 of the adjacent battery cells 10a and 10b, and an extension portion 24 extending from the body portion 22 and connected to the protection circuit module 30. The extension portion 24 may include at least one curved region 24a. The connection tab 20 may be a bus bar.

The battery cell 10 may include a battery case, an electrode assembly, and an electrolyte accommodated in the battery case. The electrode assembly and the electrolyte may electrochemically react to generate energy. The battery cell 10 may include electrode portions 11 and 12 electrically connected to the connection tab 20 and a vent 13 that provides a discharge passage for gas generated in the battery cell 10. The electrode portions 11 and 12 of the battery cell 10 may be a positive electrode terminal 11 and a negative electrode terminal 12, which have opposite polarities. The electrode portions 11 and 12 of the adjacent battery cells 10*a* and 10*b* may be electrically connected to each other by the connection tab 20, in parallel or in series. FIGS. 1 and 2 depict electrode portions 11 and 12 that are connected in series. Any one of various connection structures may be employed as desired. Also, the number and arrangement of the battery cells 10 may be changed as desired.

The plurality of battery cells 10 may be arranged in one direction such that wide surfaces of the battery cells 10 face each other. The arranged battery cells 10 may be fixed by housing members 61 through 64. The housing members 61 through 64 may include a pair of end plates 61 and 62 facing the wide surfaces of the battery cells 10, and side plates 63 and a bottom plate 64 connecting the pair of end plates 61 and 62. The side plates 63 may support side surfaces of the battery cells 10. The bottom plate 64 may support bottom surfaces of the battery cells 10. The pair of end plates 61 and 62, the side plates 63, and the bottom plate 64 may be connected by using fastener such as a bolt 65.

The protection circuit module 30 may include an electronic component, such as a protection circuit, etc. The protection circuit module 30 may be electrically connected to the connection tab 20 described below. The protection circuit module 30 may include a first protection circuit module 30*a* and a second protection circuit module 30*a*, which extend from different locations along a direction in which the battery cells 10 are arranged. The first and second protection circuit modules 30*a* and 30*b* may be separated from each other by a certain interval and may be arranged in parallel to each other so as to be electrically connected each to the adjacent connection tab 20. For example, the first protection circuit module 30*a* may extend at one side of the tops of the battery cells 10 along the direction in which the battery cells 10 are arranged, and the second protection circuit module 30*b* may extend at the other side of the tops of the battery cells 10 along the direction in which the battery cells 10 are arranged. The second protection circuit module 30*b* may be spaced apart from the first protection circuit module 30*a* by the certain interval based on the vents 13, which may be located at the tops of the battery cells between the first protection circuit module 30*a* and the second protection circuit module 30*b*. The second protection circuit module 30*b* may be parallel to the first protection circuit module 30*a*. As such, the two protection circuit modules 30*a* and 30*b* may be arranged in parallel, spaced apart from each other along a direction in which a plurality of battery cells are arranged, thereby reducing an area of a printed circuit board (PCB) forming the protection circuit modules. By using two protection circuit modules, an unnecessary area of the PCB may be reduced. The first and second protection circuit modules 30*a* and 30*b* may be connected to each other by a conductive connector 50. The connector 50 may have one side connected to the first protection circuit module 30*a* and the other side connected to the second protection circuit module 30*b*, such that the first and second protection circuit modules 30*a* and 30*b* may be electrically connected to each other.

The first and second protection circuit modules 30*a* and 30*b* may be connected to each other via a suitable method such as a soldering method, a resistance welding method, a laser welding method, or a projection welding method.

The connector 50 may have a suitable structure. In some implementations, the connector 50 may be an electric wire. In some implementations, the connecting unit 50 may be formed of an elastic or flexible material. Voltages, temperatures, and currents of the battery cells 10 may be examined and managed by using the connector 50. For example, information about voltages, currents, and temperatures received by the first protection circuit module 30*a* from the connection tabs 20 adjacent to the first protection circuit module 30*a*, and information about voltages, currents, and temperatures received by the second protection circuit module 30*b* from the connection tabs 20 adjacent to the second protection circuit module 30*b* may be transmitted through the connecting unit 50 to both sides of the protection circuit module 30 such that operation of the battery module 100 may be integrally managed by the protection circuit module 30.

When a battery cell 10 swells up, an impact of the swelling may be absorbed by the connector unit 50 according to elasticity or flexibility of the connector 50. Thus the first and second protection circuit modules 30*a* and 30*b* are prevented from being damaged.

When the protection circuit module 30 includes the first and second protection circuit modules 30*a* and 30*b*, the area of the PCB forming the protection circuit module 30 may be reduced. Thus a space inside the battery module 100 may be secured. A coupling operation of connecting the connection tab 20 and the protection circuit module 30, and also a repair if the battery module 100 were to malfunction, may be easily performed. Accordingly, operation efficiency may be increased.

Figure 3A:
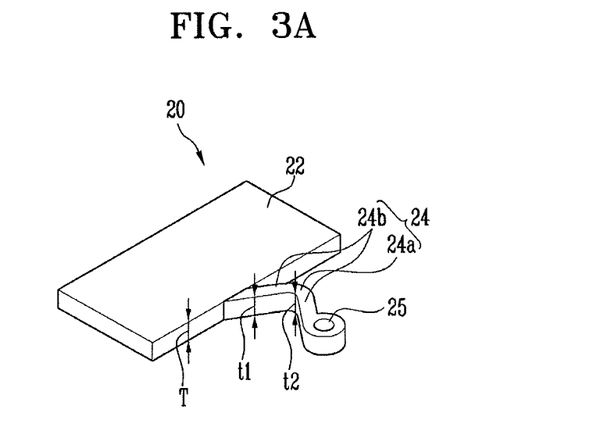
FIG. 3A illustrates an enlarged view of a connection tab according to an embodiment, in a region EA of FIG. 1.
Figure 3B:
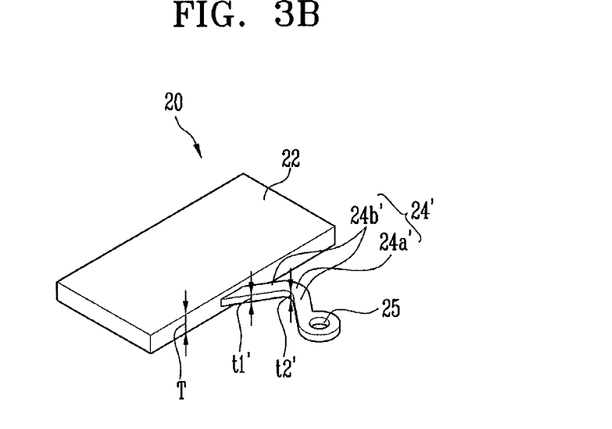
FIG. 3B illustrates an enlarged view of a connection tab according to another embodiment.

FIG. 3A illustrates an enlarged view of the connection tab 20, in a region EA of FIG. 1, according to an embodiment. FIG. 3B illustrates an enlarged view of the connection tab 20 according to another embodiment.

Referring to FIG. 3A, the connection tab 20 according to an embodiment may include the body portion 22 which directly contacts the electrode portions 11 and 12, and the extension portion 24, which extends extending from the body portion 22 and is electrically connected to the protection circuit module 30.

The extension portion 24 may be longer than a distance between the body portion 22 and the protection circuit module 30, such that the extension portion 24 is deformable to some extent according to movement of the battery cell 10 if a swelling phenomenon in which the battery cell 10 swells up were to be generated. The extension portion 24 may include at least one curved region 24*a* to have tension. The curved region 24*a* may have at least one smooth curved surface and may be on the same plane and have the same thickness as a non-curved region 24*b* of the extension portion 24. Accordingly, if the swelling phenomenon were generated due to over-charging or over-discharging of the battery cell 10, an impact could be absorbed and a deformation degree of freedom could be increased by the tension of the curved region 24*a*. Thus, mutual contact reliability may be maintained. Consequently safety may be increased. Also, the protection circuit module 30 may be prevented from being fractured or damaged due to impact or pressure from the connection tab 20. The number and shape of the curved region 24*a* are not limited to what is shown in FIG. 3A, and may vary as desired. The extension portion 24 may include at least one linear line, wherein such a linear line is bent to form a bent shape. For example, in the current embodiment, the curved region 24*a* has the smooth curved surface.

As shown in FIG. 3A, the extension portion 24 according to an embodiment may include the curved region 24*a* and a non-curved region 24*b* excluding the curved region 24*a*. A thickness t2 of the curved region 24*a* and a thickness t1 of the non-curved region 24*b* may be the same. The thicknesses t1 and t2 of the extension portion 24 may be the same as a thickness T of the body portion 22. In the embodiment shown in FIG. 3B, the thicknesses t1' and t2' of an extension portion 24' may be less than the thickness T of the body portion 22. When the thicknesses t1' and t2' of the extension portion 24' are less than the thickness T of the body portion 22, the tension of a curved region 24*a*' may be greater than the tension of the curved region 24*a*. Thus, impact absorption and a deformation degree of freedom may be further increased.

The extension portion 24 or 24' of the connection tab 20 may be formed of the same material as the body portion 22.

In a comparative embodiment, a protection circuit module of a battery module is connected to a connection tab via a coupling unit having a metal plate shape. In this case, when a battery cell swells up, components of the battery module may be moved, for example, the battery cell is moved, which may thereby cause parts of the protection circuit module to break. A coupled region of the protection circuit module and the connection tab in the comparative embodiment may be cracked. Also, a circuitry short may be generated in the protection circuit module, and the connection tab may also be damaged.

By forming the extension portion 24 of the connection tab 20 to be longer than the distance between the body portion 22 of the connection tab 20 and the protection circuit module 30, and by providing the curved region 24*a* in at least one region of the extension portion 24, shock absorption and deformation according to the tension of the curved region 24*a* may be enabled. Accordingly, the protection circuit module 30 may be prevented from being fractured due to impact or pressure from the connection tab 20 and damaged. Accordingly, the quality of the battery module 100 may be increased.

Figure 4:
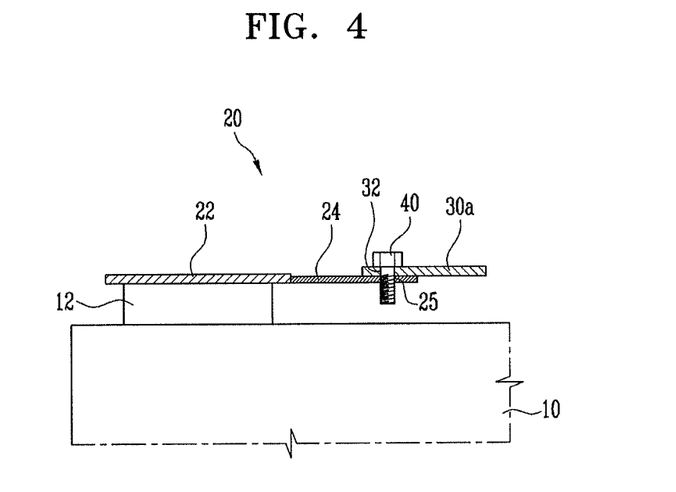
FIG. 4 illustrates a cross-sectional view taken along a line I-I' of FIG. 1.

FIG. 4 illustrates a cross-sectional view taken along a line I-I' of FIG. 1.

Hereinafter, a connection relationship between the connection tab 20 and the protection circuit module 30 will be described with reference to FIG. 4.

The electrode portions 11 and 12 provided at surfaces at one side of the adjacent battery cells 10*a* and 10*b* of the battery module 100 may be connected to each other by the connection tab 20. As described above, the connection tab 20 may include the body portion 22 directly surface-contacting the electrode portions 11 and 12 of the adjacent battery cells 10*a* and 10*b* and the extension portion 24 extending from the body portion 22, connected to one end of the protection circuit module 30. The extension portion 24 may include the curved region 24*a*. An end portion of the extension portion 24 may include a through hole 50.

The protection circuit module 30 may include a coupling hole 32 in a location corresponding to the through hole 25. The through hole 25 and the coupling hole 32 may have a shape corresponding to a shape of a coupling member 40. When the through hole 25 and the coupling hole 32 are located on the same line in a vertical direction, the coupling member 40 may sequentially penetrate through the coupling hole 32 and the through hole 25, thereby fixing the protection circuit module 30 on the top of the connection tab 20. Accordingly, the connection tab 20 and the protection circuit module 30 may be strongly coupled.

Figure 5A:
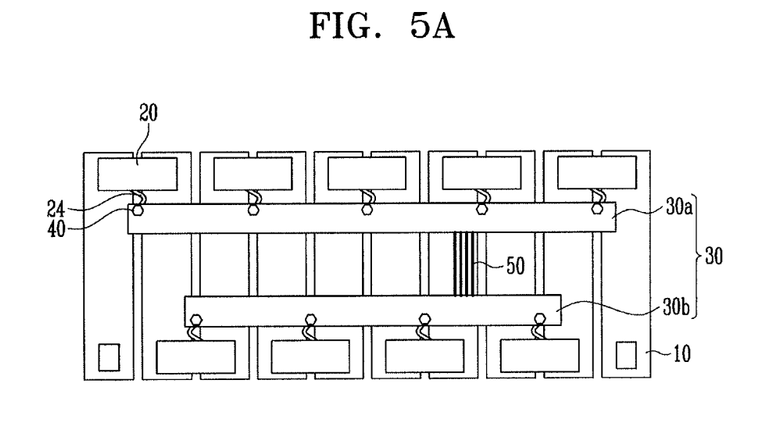
FIG. 5A illustrates a plan view of a top of a battery module, according to an embodiment.
Figure 5B:
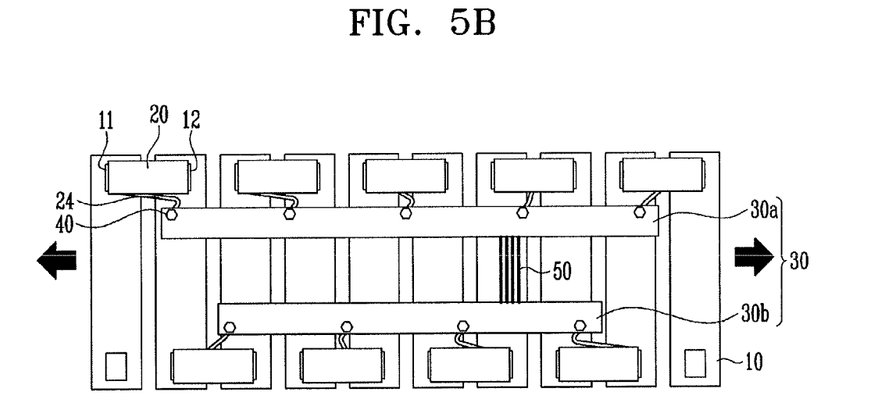
FIG. 5B illustrates a plan view for describing an operating state of the battery module of FIG. 5A when a swelling phenomenon occurs, according to an embodiment.

FIG. 5A illustrates a plan view of a top of the battery module 100, according to an embodiment, and FIG. 5B illustrates a plan view for describing an operating state of the battery module 100 of FIG. 5A when a swelling phenomenon occurs.

Referring to FIGS. 5A and 5B, the electrode portions 11 and 12 provided on top surfaces of the adjacent battery cells 10*a* and 10*b* in the battery module 100 may be connected to each other via the connection tab 20. The connection tab 20 may include the body portion 22 directly surface-contacting the electrode portions 11 and 12 of the adjacent battery cells 10*a* and 10*b*, the extension portion 24 extending from the body portion 22, connected to one end of the protection circuit module 30, and having the curved region 24*a*, and the through hole 25 in one end portion of the extension portion 24.

The protection circuit module 30 may include the coupling hole 32 in a location corresponding to the through hole 25. The through hole 25 and the coupling hole 32 may be coupled to each other as the coupling member 40 is inserted therethrough.

When a swelling phenomenon is generated due to over-charging or over-discharging of the battery cell 10, components of the battery module 100 may move. For example, the battery cells 10 may move apart from each other, as shown in FIG. 5B, such that spaces may be generated between the battery cells 10. The deformation degree of freedom of the extension portion 24 may be further increased by the curved region 24*a*. Thus, mutual contact reliability between the connection tab 20 and the protection circuit module 30 may be maintained.

As described above, when there is the movement of the battery cells 10, an impact may be absorbed by the curved region 24*a* and deformation may be enabled by the extension portion 24. Thus, the connection tab 20 and the protection circuit module 30 may be stably connected to each other. Also, the protection circuit module 30 may be prevented from being fractured and damaged due to impact or pressure from the connection tab 20.

By way of summation and review, in a general battery module that includes a plurality of battery cells that are connected to each other by a connection tab that is connected to a battery management system (BMS), if a certain portion of the battery cell swells up while the battery cells are continuously used, there is a risk that a connecting portion between the BMS and the connection tab connected to an electrode terminal could become fractured.

When a voltage, current, and temperature sensing portion of the BMS is directly coupled to the bus bar, locations of components of the battery module could be altered due to swelling of the battery cell, a coupled portion of the BMS and the bus bar could become cracked.

Embodiments include a battery module having a structure providing high safety.

Embodiments include a battery module that helps to prevent a protection circuit module from being fractured or damaged due impact or pressure from a connection tab.

Embodiments include a battery module in which a connection tab and a protection circuit module are strongly coupled together.

Embodiments include a battery module for securing a space between a connection tab and a protection circuit module.

According to embodiments, a connection tab includes a curved region at one region. Thus, even if a battery cell were to swell up due to over-charging or over-discharging, a deformation degree of freedom may be increased according to tension of the curved region. Thereby, mutual electric connection reliability may be maintained. Accordingly, safety of the battery module may be increased.

Also, according to embodiments, an extension portion is longer than a distance between a body portion and a protection circuit module. Accordingly, deformation of the extension portion is free when a battery cell swells up, and thus the protection circuit module may be prevented from being fractured from a connection tab and damaged.

Also, according to embodiments, an extension portion and a protection circuit module are connected to each other by a coupling unit. Accordingly, a connection tab and the protection circuit module may be further strongly coupled to each other, and thus quality of the battery module may be increased.

Also, according embodiments, a protection circuit module includes first and second protection circuit modules. Accordingly, a space inside the battery module may be secured, and thus operation efficiency may be increased. An operation of coupling the protection circuit module to a connection tab and repair when the battery module malfunctions are easily performed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery module, comprising:
a plurality of battery cells arranged in one direction, each of the battery cells including electrode portions;
a connection tab connecting adjacent battery cells of the plurality of battery cells; and
a protection circuit module having one side end portion connected to the connection tab,
wherein the connection tab includes:
a body portion that contacts the electrode portions of the adjacent battery cells, and
an extension portion extending from the body portion, the extension portion being connected to the protection circuit module,
wherein the extension portion includes at least one curved region and at least two non-curved regions, the at least one curved region connecting between the at least two non-curved regions, and the at least one curved region and the at least two non-curved regions being in a same plane, and
wherein an entirety of the body portion and an entirety of the extension portion of the connection tab overlap surfaces of battery cells of the plurality of battery cells that face a same direction.

2. The battery module as claimed in claim 1, wherein the one side end portion of the protection circuit module is connected to a top surface of the connection tab.

3. The battery module as claimed in claim 1, wherein the at least one curved region and the at least two non-curved regions of the extension portion have a same thickness.

4. The battery module as claimed in claim 1, wherein a length of the extension portion is greater than a distance between the body portion and the protection circuit module.

5. The battery module as claimed in claim 4, wherein a thickness of the extension portion is less than or equal to a thickness of the body portion.

6. The battery module as claimed in claim 5, wherein the extension portion is formed of a same material as the body portion.

7. The battery module as claimed in claim 4, wherein:
at least one through hole is located at an end portion of the extension portion,
a coupling hole is located in the protection circuit module to correspond to the through hole, and
the through hole and the coupling hole are located on a same line in a vertical direction and are coupled to each other by a coupling unit.

8. The battery module as claimed in claim 1, wherein:
the protection circuit module includes a first protection circuit module and a second protection circuit module, which respectively extend along opposite upper sides of the plurality of battery cells along a direction in which the plurality of battery cells are arranged, and
the first and second protection circuit modules are spaced apart from each other in opposite sides with respect to vents of the plurality of battery cells and are parallel to each other.

9. The battery module as claimed in claim 8, wherein the first and second protection circuit modules are connected to each other by at least one connecting unit.

10. The battery module as claimed in claim 9, wherein the connecting unit is formed of an elastic or flexible material.

11. The battery module as claimed in claim 1, wherein a top surface of the body portion, a top surface of the extension portion, and a top surface of the protection circuit module face a same direction and are parallel to each other.

12. The battery module as claimed in claim 1, wherein the connection tab connects battery cells of the plurality of battery cells that are adjacent to each other along a first direction, longitudinal directions of the main body of the connection tab and of the protection circuit module extending in the first direction.

13. The battery module as claimed in claim 12, wherein the main body of the connection tab and the protection circuit module are parallel to each other and are adjacent to each other along a second direction perpendicular to the first direction, the extension portion extending between the main body and the protection circuit module to connect therebetween.

14. The battery module as claimed in claim 1, wherein an entirety of the extension portion is coplanar with the body portion.

15. A battery module, comprising:
a plurality of battery cells arranged in one direction, each of the battery cells including electrode portions;
a connection tab connecting adjacent battery cells of the plurality of battery cells; and
a protection circuit module having one side end portion connected to the connection tab,
wherein the connection tab includes:
a body portion that contacts the electrode portions of the adjacent battery cells, and
an extension portion extending from the body portion, the extension portion being connected to the protection circuit module,
wherein the extension portion includes at least one curved region and at least two non-curved regions, the at least one curved region connecting between the at least two non-curved regions, and the at least one curved region and the at least two non-curved regions being in a same plane, and wherein a top surface of the body portion, a top surface of the extension portion, and a top surface of the protection circuit module face a same direction.

\* \* \* \* \*